Aug. 19, 1969
TATSUO FUJII
3,461,783
EXPOSURE MEASURING MECHANISM FOR A SINGLE
LENS REFLEX CAMERA HAVING
INTERCHANGEABLE LENSES
Filed Feb. 10, 1966
2 Sheets-Sheet 1
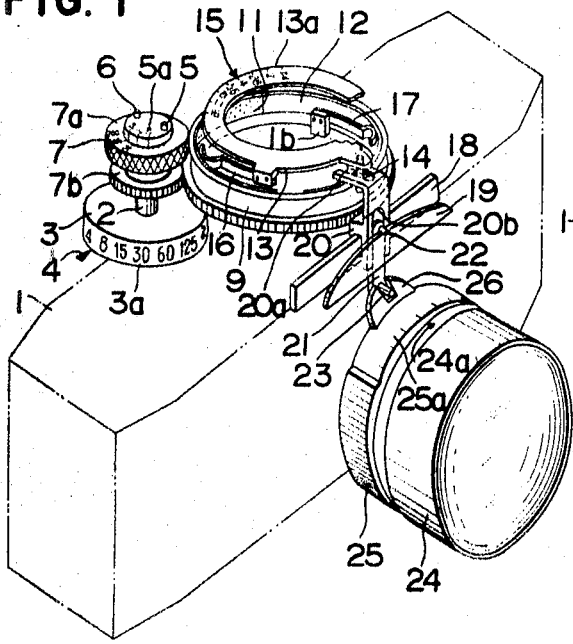
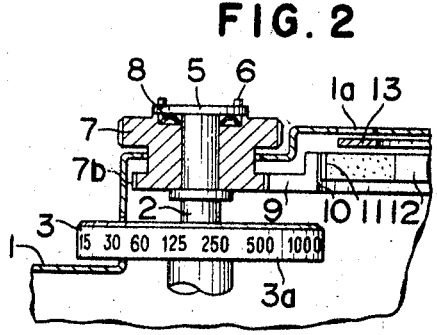
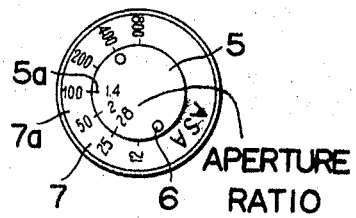
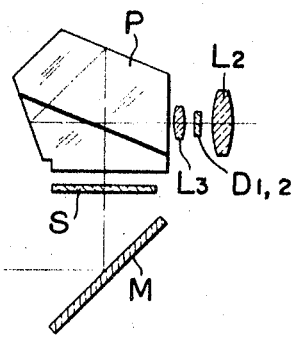
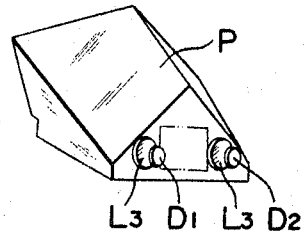
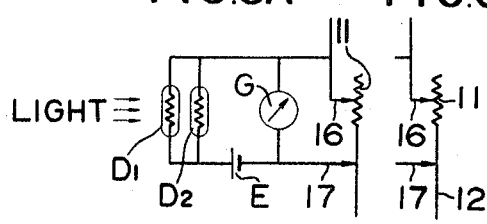
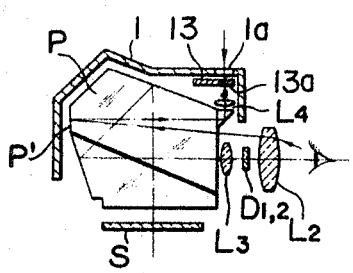
INVENTOR.
TATSUO FUJII
BY
ATTORNEY

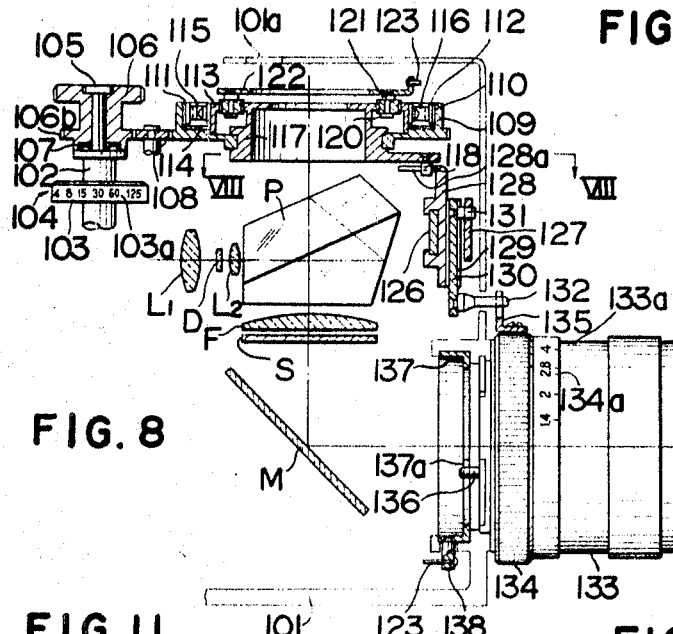
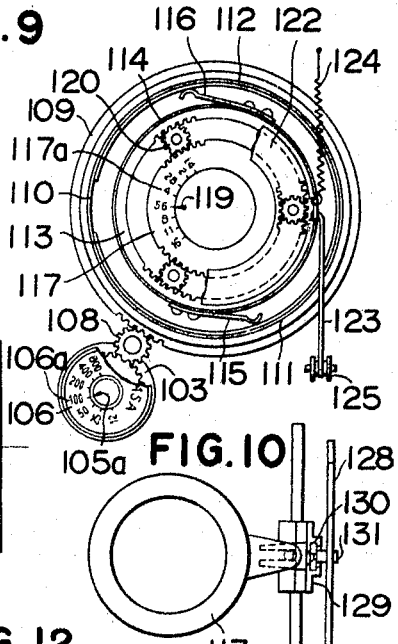
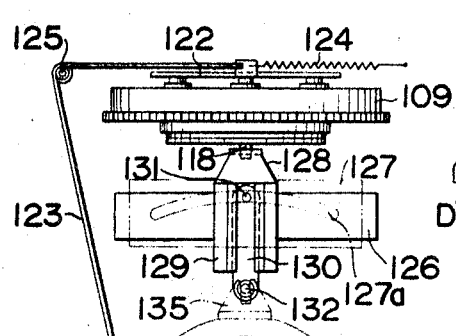
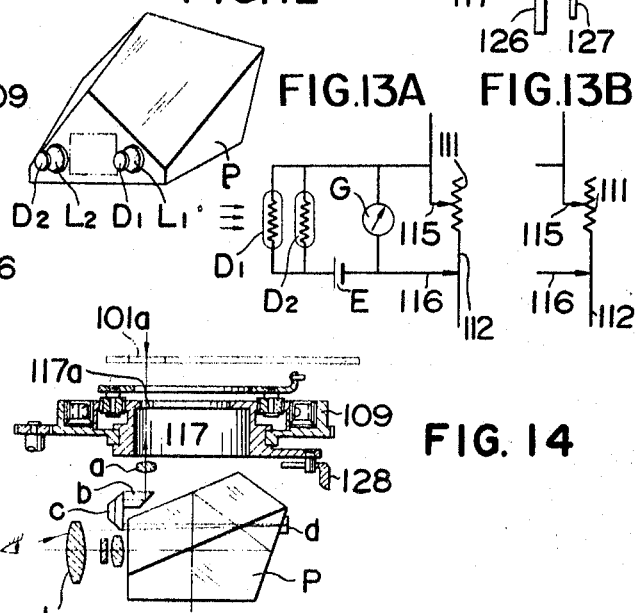
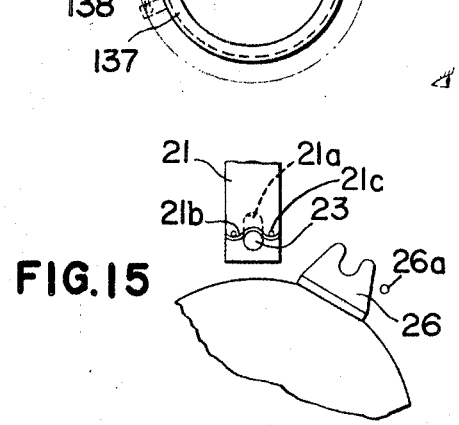

United States Patent Office 3,461,783
Patented Aug. 19, 1969

3,461,783
EXPOSURE MEASURING MECHANISM FOR A SINGLE LENS REFLEX CAMERA HAVING INTERCHANGEABLE LENSES
Tatsuo Fujii, Minato-ku, Tokyo, Japan, assignor to Nippon Kogaku K.K., Tokyo, Japan, a corporation of Japan
Filed Feb. 10, 1966, Ser. No. 541,867
Int. Cl. G01j 1/10; G03b 19/12
U.S. Cl. 95—10                         7 Claims

ABSTRACT OF THE DISCLOSURE

An exposure measuring mechanism for a single lens reflex camera having interchangeable objective lenses of different aperture ratios with the exposure measuring and calculating mechanism built into the camera body. A variable resistor which forms a part of the exposure meter circuit is movable relative to a relatively movable electrical contact. The circuit elements are relatively movable by the shutter setting mechanism of the camera and an aperture ratio link interlocked with the stop signal member on the interchangeable objective lens mounted on the camera body.

The present invention relates to an exposure measuring mechanism for a single lens reflex camera having interchangeable lenses to determine the appropriate exposure of the object to be photographed by measuring the illumination of the light rays passing through a camera lens.

Generally speaking, in case an exposure measuring mechanism is built into an interchangeable lens camera, the calculating mechanism provided in the camera body and the stopping operation of the lens must be interlocked, but various kinds of limitations must be considered for such interlocking. In other words, in the relationship between the interchangeable lenses, the stopping operational angle required for changing the stop value from a certain stop value to another stop value must be the same with each lens, and in the relationship between each lens and the exposure calculating mechanism, the respective stop values indicated by the calculating mechanism and the stop values of the respective lenses must correspond correctly. In addition, when the respective lenses are mounted on the camera, the interlocking element of the calculating mechanism and the stop signal member of the lens must be perfectly interlocked, and at the same time, the indicated stop value of the calculating mechanism and the stop value of the lens must coincide. The position of stop signal member provided on the lens is generally in a position common to each of the lenses. While this is true of single lens reflex cameras, in the case of a built-in exposure measuring mechanism, problems arise due to the recent adoption of automatic pre-set mechanisms for the lenses.

In the case of an automatic pre-set stopping mechanism for a lens, the quantity of light rays corresponding to the maximum aperture ratio of the lens mounted is transmitted to the light receiving portion of the camera since the lens is at its maximum stop at the time the light rays are measured. There is no problem if the maximum aperture ratios of the interchangeable lenses are the same. In the case where there is a difference of aperture ratio between the respective lenses, even though the same object is measured, the obtained values are different because the quantity of incoming light rays is different. For example, the value obtained by measuring light rays by using a lens whose aperture ratio is $F:2$, and the value obtained by measuring light rays by a lens whose aperture ratio is $F:1.4$ or $F:2.8$, are different by one stop when calculating an exposure value. In accordance with the conventional exposure measuring device, only the focusing operation is carried out at the maximum stop, and thereafter the aperture of lens is stopped down to the predetermined value for measuring light rays.

The main object of the present invention is to overcome the above mentioned drawback, and to provide an exposure measuring mechanism whereby the light rays can be measured at the maximum aperture ratio of any of the interchangeable lenses mounted on the camera.

According to one of the features of the present invention a member having the scale of maximum aperture ratios of the various interchangeable lenses to be mounted on the camera, and a second member having a film speed scale are provided to rotate relative to each other, either one of the said members being fixed to the shutter time setting member or a member interlocked therewith so that the operations of one of the members and the shutter time setting member is fed into a built-in exposure calculating mechanism through the other one of the two members to attain the stated object of the invention.

Another feature of the present invention provides an aperture ratio correction member fitted to the aperture ratio signal member on the lens, a differential device such as a planetary gearing provided between the members is interlocked to the stop signal member and an exposure calculating member and one of the components of the differential device and the aperture ratio correction member being interlocked to attain the aforesaid object.

The following is a detailed explanation of the embodiments shown in the attached drawings illustrating the present invention, in which FIG. 1 is the perspective view of the major portion of the first embodiment of the present invention;

FIG. 2 is a magnified sectional view of the cross-section of a portion of FIG. 1;

FIG. 3 is a plan view of a part of FIG. 2, showing the relation between the aperture ratio and film sensitivity;

FIG. 4 and FIG. 5 show the disposition of optical system used in the first embodiment;

FIGS. 6A and 6B show the circuit of the exposure-meter for lenses of different aperture ratios;

FIG. 7 is the embodiment as shown in FIG. 1 where stop-indication is observed by means of the finder eye-piece lens;

FIG. 8 to FIG. 14 show the second embodiment of the present invention, and FIG. 8 is the side view of the major part thereof and is partially shown by cross-section;

FIG. 9 is the upper view of the major part thereof;

FIG. 10 is the cross-sectional view taken along VIII—VIII line;

FIG. 11 is the right side view of FIG. 8;

FIG. 12 is a drawing illustrative of the light receiving portion;

FIGS. 13A and 13B show the exposure meter circuit for lenses of different aperture ratios;

FIG. 14 shows the embodiment in case stop-indication is observed by the finder eyepiece lens; and FIG. 15 shows an automatic arrangement for engaging and disengaging the stop signal member of a lens.

Referring now in detail to FIGS. 1 through 7 of the drawings wherein an embodiment of the present invention is illustrated, a single lens reflex camera body 1 is shown in phantom line, the camera being provided with a shutter speed setting shaft 2 which is interlocked with the timing mechanism (not shown) of the camera in the usual manner. Secured to the setting shaft 2 is a shutter speed setting knob 3 having engraved in its peripheral edge the various speed setting indicia 3a, the indicia being read in connection with a stationary reference mark 4 provided on the camera body. Mounted on the upper end of the shaft 2 is an aperture ratio indicator plate 5 having engraved thereon aperture ratio indicia 5a, the plate being provided with upstanding pins 6 for aiding in rotating the setting shaft 2. Rotatably mounted on the setting shaft 2 below the aperture ratio plate 5 is a film speed ring 7 having engraved thereon the various film speed indicia 7a. For purposes hereinafter appearing, the divisions or spacings of the film speed indicia are the same as that provided for the aperture ratio indicia. The film speed ring 7 is formed with a ring gear 7b for purposes hereinafter appearing. Interposed between the aperture ratio plate 5 and the speed setting ring 7 is a spring washer 8, the frictional pressure generated by the washer being such that the rotation of the aperture plate 5 is transmitted to the film speed ring 7.

Rotatably mounted on the camera body 1 by means not otherwise illustrated but preferably surrounding the penta-dach prism P of the camera view finder is an exposure calculating gear 9 meshing with the ring gear 7b provided on the film speed ring. Cemented to the interior surface of the gear 9 is a thin strip 10 of insulating material forming an electrically insulated support for a resistor 11 and a strip conductor 12 electrically interconnected. Rotatably mounted about the same axis as the gear 9 is a calcultaing ring 13 bearing thereon stop indicia 13a which is read through a window 1a (FIG. 2) formed in the camera body against a fixed reference mark 15. The calculating ring is provided with a dependent pin 14 and an electrical contact 16 of flexible material secured thereto and insulated therefrom. A similar electrical contact 17 is also provided, the second contact being secured to the camera body. The contact 16 is adapted to engage the resistor 11, while the contact 17 engages the conductor 12 secured to the inner surface of the gear 9.

Secured to the front of the camera body in a suitable manner, are a guide rail 18 and a cam plate 19. Slidably mounted on the guide rail 18 is a stop interlocking plate 20 having a rearwardly projecting upper end formed with a groove 20a for receiving the pin 14 provided on the calculating ring 13. The interlocking plate is further formed with a vertically disposed groove 20b in which an interlocking member 21 is slidably received. The interlocking member 21 is provided at its upper end with a forwardly extending pin 22 which rides over the cam surface provided on the cam 19. A second or connecting pin 23 is provided in the lower end of the interlocking member, the pin being received by a stop signal member 26 provided on the stop setting ring 25 of an interchangeable lens 24.

It will be noted from FIG. 7 of the drawings, that the stop indicia 13a provided on the calculating ring may be viewed through the view finder. This may be readily done by making the ring 13 transparent and by providing an optical system $L_4$ and a reflective surface P on the penta-dach prism P of the view finder. The stop setting may then be read through the eyepiece lens $L_2$.

With reference to FIG. 4 and FIG. 5 of the drawings, there is illustrated the optical arrangement for the embodiment of the invention described, comprising a camera lens $L_1$, a viewing plate or mirror M, a focal plate S and a penta-dach prism P. An eyepiece $L_2$ is provided for viewing the object to be photographed while lens(es) $L_3$ project a portion of the light rays impinging on the focal plate S to the surfaces of photoelectric cells $D_1$ and $D_2$.

With reference to FIG. 6A of the drawings, an exposure measurement circuit is illustrated in which a battery E forms the power supply for the circuit interconnecting the photocells $D_1$ and $D_2$ with a galvanometer G and the resistor 11 and its contact 16, and the conductor 12 and its contact 17. The relative position of the contact 16 on resistor 11 illustrated in this figure is obtained by using a lens having an aperture ratio of F:1.4, for example, to measure the light rays passing through wide open aperture of the chosen reference lens. Other lenses having aperture ratios of F:2, or F:1.8 or F:2.5 may be used as the reference.

With the foregoing description of the cooperation of the various elements, and using a lens with a maximum aperture ratio of F:1.4 as a standard, the aperture ratio indicia 5a is adjusted to align with the film speed of the film loaded in the camera. Assuming the film speed as being ASA 100, the "1.4" mark of the aperture dial 5 is aligned with the "100" mark on the film speed dial. The shutter speed knob 3 and the stop setting ring 25 are rotated to determine the proper exposure of the object to be photographed. The rotation of the knob 3 will rotate the film speed ring 7 due to the frictional pressure of washer 8 thereby rotating the gear 7b and meshing gear 9. The rotation of the gear 9 will position the resistor 11 and conductor 12 relative to their respective contacts 16 and 17. The rotation of the stop setting ring 25 will move the interlocking member 20 through its connection therewith through the connecting pin 23. This causes movement of the interlocking plate 20 along the guide rail 18 to rotate the calculating ring 13. The contact 16 is thus moved relative to the resistor 11. The range of movement of the calculating ring 13 through interlocking member and plate is determined by the cam 19 abutted by the cam pin 22 and the guide rail 18. The calculating ring 13 bears the aperture ratio indicia 13a which can then be viewed either through the window 1a or through the view finder as illustrated in FIG. 7.

In FIG. 15 there is illustrated a means whereby the connection of the stop signal member 26 of a lens and the connecting pin 23 may be automatically made and uncoupled. To this end the lower end of interlocking member 21 is formed with a groove 21a having a spring 21b restrained by pins 21c holding the connecting pin 23. A pin 26a secured in the camera body is engaged by the pin 23 when the lens is rotated clockwise to a position beyond the stop range. Further rotation will cause the pin 23 to move upwardly against the action of the spring 21b to release the pin 23 from the slot provided in the stop signal member 26.

Should an interchangeable lens having an aperture ratio of F:2 be mounted on the camera body, the quantity of the light rays coming from the same object would be reduced by half, or decreased one stop. With the stop value "2" on the aperture ratio knob 5 aligned with the "100" mark of the film speed dial 7a, the relative positions of the resistor 11 and the contact 16 would be that illustrated in FIG. 6B. The light value indicated by the galvanometer G is the same value obtained by stopping down the lens having an aperture ratio of F:1.4 to F:2.

In the case where the quantity of light falling on the photocells $D_1$ and $D_2$ is half the reference value, the calculating mechanism described operates in the same manner as in the case of the F:1.4 lens, and the exposure measuring operation is carried through in the same manner. This is also true of any other interchangeable lenses having other aperture ratios of F:2.8 to 5.6 for example, and also true with respect to any film speed other than the ASA 100 rating given above. The change in the resistance value of the resistor 11 is determined by the design of the exposure meter and correction of the aperture ratio will also apply in the case of intermediate values of $F:1.8$, $F:2.5$ and $F:3.5$ and the like. As to the reading of the exposure meter provided, either the "Pointer Following System" or the "Zero According System" may be followed.

The invention so far described can be used with various types of interchangeable lenses having different maximum aperture ratios and automatic preset stopping mechanisms since the light rays are measured at maximum apertures. Since the aperture ratio plate is interlocked with the shutter setting knob, the invention thus far described is equally advantageous and effective for the separate type of exposure meter.

Referring now to FIGS. 8 through 13 wherein a second embodiment of the invention is illustrated, a portion of the camera body 101 is illustrated by the phantom line, the camera being provided with a shutter time setting shaft 102 interlocked with the shutter timing mechanism (not shown) of the camera. Secured to the setting shaft 102 is a time setting knob 103 having the shutter time indicia 103a engraved in its peripheral edge which is read in conjunction with a reference mark 104 on the camera body. Fixed to the upper end of the shaft 102 is an indicator plate 105 having engraved thereon a reference mark 105a. Rotatably mounted on the shaft 102 is a film speed knob 106 having thereon film speed indica 106a which is read in conjunction with the reference mark 105a on the indicator plate. The film speed knob is formed at its lower end with a gear 106b which meshes with an intermediate gear 108 suitably mounted in the camera body. A spring washer 107 is interposed between the film speed knob 106 and the time setting knob 103 for the same purpose as washer 8 in the first embodiment.

A calculating gear 109 meshing with the intermediate gear 108 is suitably mounted for rotation in the camera body, the inner surface of the gear having a thin strip 110 of insulating material cemented thereto to form an insulating support for a resistor 111 and a conductor 112. Rotatably mounted concentric with the calculating gear is a terminal gear 113 having cemented to its outer periphery a strip of insulating material 114 forming an insulating support for flexible contacts 115 and 116. The contact 115 engages the resistor 111 on the calculating gear while the contact 116 engages the conductor 112.

Rotatably mounted coaxially with and relative to the calculating gear 109 is an interlocking gear 117 having thereon the stop indicia 117a which may be read against a fixed reference mark 119. The stop setting may be viewed through a window 101a (FIG. 8) or it may be viewed through the view finder (FIG. 14) in a manner previously described in connection with the first embodiment. For purposes hereinafter appearing a dependent pin 118 is provided on the interlocking gear 117.

Planetary gears 120 are provided meshing with the calculating gear 109 and the interlocking gear 117, the gears being rotatably mounted on shafts 121 carried by a supporting plate 122. The supporting plate 122 is interlocked by a thin cable or wire to an aperture ratio correcting ring 137, hereinafter described, and is biased by a tension spring 124 in a counterclockwise direction (FIG. 9). The cable or wire passes over a pulley 125 fixed in the camera body.

Secured to the front of the camera body is a guide plate 126 and a cam plate 127 (FIG. 11), the cam plate being formed with an arcuate groove 127a. Slidably mounted on the guide plate 127 is an interlocking plate 128 having a rearwardly extending upper portion formed with a groove 128a to receive the dependent pin 118 provided on the gear 117. The interlocking plate 128 is provided with rails 129 forming a vertical slide support for an interlocking member 130 provided at its upper end with a pin 131 received in the cam groove 127a and at its lower end with a pin 132 which is received in the fork arrangement provided for the stop signal member 135 provided on the stop setting ring 134 bearing stop indicia 134a for the interchangeable lens 133.

For purposes hereinafter appearing, the lens 133 will be considered as having a maximum aperture ratio of $F:1.4$ and provided with an automatic preset stopping mechanism. The stop signal member 135 is angular positioned on all of the interchangeable lenses in the same relative position. Each of the interchangeable lenses is provided with a rearwardly projecting aperture ratio signal pin 136, the angular position of the pin on the lens barrel being determined by the maximum aperture ratio of the particular lens.

Rotatably mounted within the camera body on the lens mounting flange is the aperature ratio correction ring 137 interlocked by the cable 123 to the planetary gear supporting plate 122, the cable being connected to a tongue 138 provided on the ring. As will hereinafter appear the ring 137 is provided with an abutment 137a adapted to be engaged by the signal pin 136 on the lens.

The optical system for the camera is illustrated in FIG. 8 and is similar to that illustrated in FIG. 4, the system of FIG. 8 including a Fresnel lens F. FIG 12 is similar to FIG. 5 in illustrating the positioning of the photocells $D_1$ and $D_2$, while FIG. 14 is similar to FIG. 7 in illustrating an optical system for projecting the stop indicia 117a, 119 into the eyepiece lens $L_1$. FIGS. 13A and 13B are similar to FIGS. 6A and 6B described in connection with the first embodiment of the invention described above, the reference characters of the resistor, conductor and contacts being those of the second embodiment.

Considering a lens having an aperture ratio of $F:1.4$ mounted in the camera, the signal pin 136 thereof will rotate the correction ring 137 to a predetermined angular position through the abutment of the pin 136 and the ring abutment 137a. Through cable 123 the rotation of the ring 137 will rotate the supporting plate 122 counterclockwise a predetermined amount. The planetary gears 120 are thus rotated to rotate the terminal gear 113 thereby positioning the contact 115 relative to the resistor 111. Since the exposure calculating mechanism is set in accordance with the quantity of light measured through a lens of $F:1.4$ aperture, the relative position of the resistor 111 and contact 115 becomes the reference position of aperture ratio correction. The engagement and disengagement of the stop signal member 135 with the connecting pin 132 are automatically carried out at a position beyond the stopping range.

In rotating the film speed ring 106 to set the film speed of the film loaded in the camera into the calculating mechanism, FIG. 10 illustrating a setting of 100 ASA, and rotating the shutter setting knob 103 and the stop setting ring 134 of the lens, the relative positions of the resistor 111 and its contact 115 are set and the galvanometer G will be operated to indicate the proper exposure for the object to be photographed. The rotation of the shutter setting knob 103 will rotate the film speed ring 106 through spring washer 107 and through gear 106b rotates the calculating gear 109 through the intermediate gear 108. This will angularly displace the resistor 111 secured to the gear 109 relative to the contact 115. The rotation of the lens stop setting ring 134 will slide the interlocking member 130 in rails 129 restrained by the cam pin 113 in cam groove 127a and move the interlocking plate 128 along the guide 127 to rotate the interlocking gear 117 through pin 118. Through the idler motion of the planetary gearing, the contact gear 113 is rotated in a reverse direction to position the contact 115 carried thereby relative to the resistor 111. The stop value of the interchangeable lens and the stop value of the calculating mechanism are positively interlocked, the stop value being easily read through the window 101a or the viewfinder, and compared with the stop setting indicia 134a of the stop ring. It will be understood that the range of stop settings transferred through the interlocking plate 128 may be determined by the guide plate 126 and the cam groove 127a in the cam plate.

Should another lens be mounted on the camera, for example a lens of F:2, the aperture ratio pin 136 provided thereon is angularly positioned to provide a correction of one stop in the relative position of the contact 115. The pin 136 of the F:2 lens will rotate the correction ring 137 an additional amount as illustrated by the dotted line positions in FIG. 11. This additional rotation will change the relative position of the contact 115 (FIG. 13b) to adjust the resistance value of the resistor 111, so that the value now indicated by the galvanometer G is the same as that for a lens stopped down to F:1.2. Thus even with the quantity of light measured providing a value less than the reference value, the calculating mechanism is operated in the same manner and the exposure measurement operation carried out the same as that for an F:1.4 lens. This is also true when interchangeable lenses having various aperture ratios are mounted in the camera, the aperture ratio signal pin 136 provided for each of the lenses being angularly positioned in accordance with the maximum aperture.

The exposure measuring mechanism herein described may thus be used with various interchangeable lenses which may be provided with various automatic preset mechanisms since corrections are made in accordance with the aperture ratios and reference is made at maximum aperture ratios. It will be appreciated that corrections are made for lenses of aperature ratios in a series, that corrections can also be made at other intermediate F values of the lenses.

What is claimed is:

1. Exposure measuring mechanism for a single lens reflex camera having interchangeable lenses, comprising
    a member having a scale of the maximum aperture ratios of the various interchangeable lenses to be mounted on the camera body,
    a member having a scale of film speeds, both members being rotated relatively to assure correspondency of both scales,
    a shutter time setting means, and
    an exposure calculating mechanism, one of the two members being rotatable in unison with the shutter time setting means, and the operation of said one member and the shutter time means being transmitted to the exposure calculating mechanism through the aid of the remaining one of the two members.

2. Exposure measuring mechanism according to claim 1, wherein the exposure calculating mechanism includes a member positionable thereby,
    stop value indicia of the stop values of the interchangeable lenses on said member,
    optical viewing means for the camera including a penta prism and a finder eyepiece, and
    reflecting means on the penta prism for reflecting the stop value indicia on said member into the eyepiece of the viewing means.

3. Exposure measurement mechanism according to claim 1, wherein the shutter time setting means includes a shutter speed setting shaft, the aperture ratio scale member being fixed to said shaft and the film speed member being rotatably mounted on the shaft,
    friction means interposed between the aperture ratio scale member and the film speed member permitting relative movement between the two members,
    a gear rotatable with the film speed member, and means transmitting the rotation of said gear to the exposure calculating mechanism.

4. Exposure measurement mechanism according to claim 3, wherein a stop signal member is provided on the lens,
    a guide rail mounted in the camera body adjacent the lens mount of the camera,
    an interlocking plate slidably mounted on the guide rail,
    a groove in the interlocking plate,
    an interlocking member slidably received in said groove means for coupling the interlocking member and the stop signal member for sliding the interlocking member in its groove and sliding the interlocking plate along the guide rail,
    a cam member secured to the camera body,
    a pin on said interlocking member and engaging said cam member to limit the range of movement of the interlocking member in its groove,
    a calculating gear forming a part of the exposure calculating mechanism rotatable by the gear on the film speed member,
    a calculating ring forming a part of the exposure calculating mechanism and rotatable relative to the calculating gear by the movement of the interlocking plate on the guide rail by the stop signal member on the lens,
    a resistor secured to the calculating gear,
    a contact secured to the calculating ring, the positions of the resistor and contact being relatively movable upon rotation of the calculating gear and ring, respectively, and
    an exposure meter circuit including at least one photocell, a voltage source, a galvanometer and the resistor and its contact to measure the light value of the scene to be photographed.

5. Exposure measuring mechanism for a single lens reflex camera having interchangeable lenses, comprising
    an aperture ratio signal member and a stop signal member provided for the lens an aperture ratio correction ring provided in the camera body in the vicinity of the lens mount, the aperture ratio correction ring being engaged by the aperture ratio signal member when the lens is mounted on the camera,
    an exposure calculating member,
    a member interlocked with the stop signal member, and
    a differential device provided between said interlocked member and the exposure calculating member, the differential device being interlocked with the aperture ratio correction ring.

6. Exposure measurement mechanism according to claim 5, wherein a speed shutter setting shaft is provided,
    a film speed knob rotatably mounted on the shaft,
    friction means for rotating the film speed knob when the speed setting shaft is rotated,
    a gear on said film speed knob,
    a calculating gear rotatably mounted in the camera body and forming a part of the exposure calculating mechanism,
    an interlocking gear coaxial with said calculating gear,
    a planetary gear supporting plate, planetary gears on said plate and meshing with the calculating gear and the interlocking gear,
    a resistor mounted on said calculating gear,
    a contact for engaging the resistor and mounted on the interlocking gear,
    an exposure meter circuit including at least one photocell, a voltage source, a galvanometer and the resistor and its contacts to measure the light value of the scene to be photographed, and
    means interconnecting the planetary gear supporting plate and the aperture ratio correction ring for relatively displacing the resistor and its contacts in accordance with the maximum aperture ratio of the mounted lens.

7. Exposure measurement mechanism according to claim 6 wherein a guide rail is provided in the camera body adjacent the lens mount,
    an interlocking plate slidably mounted on the guide rail,
    a guide on said plate, an interlocking member slidably received in said guide,
means for coupling the interlocking member and the stop signal member for sliding the interlocking member in its guide and sliding the interlocking plate along the guide rail upon rotation of the stop signal member,
a cam member secured to the camera body adjacent the guide rail,
a pin on said interlocking member engaging the cam member for limiting the range of movement of the interlocking member, and
means interconnecting the interlocking plate and the interlocking gear for rotating the gears relative to each other to change the relative positions of the resistor and its contact.

References Cited
UNITED STATES PATENTS

| | | |
|---|---|---|
| 3,018,706 | 1/1962 | Rentschler. |
| 3,072,029 | 1/1963 | Leitz. |
| 3,073,222 | 1/1963 | Broschke. |
| 3,078,772 | 2/1963 | Goshima. |
| 3,082,672 | 3/1963 | Swarofsky et al. |
| 3,093,043 | 6/1963 | Kinder. |
| 3,163,097 | 12/1964 | Zenyoji et al. |

NORTON ANSHER, Primary Examiner

JOSEPH F. PETERS, Jr., Assistant Examiner

U.S. Cl. X.R.

95—42, 64